US007055020B2

(12) United States Patent
Gold et al.

(10) Patent No.: US 7,055,020 B2
(45) Date of Patent: May 30, 2006

(54) FLUSHABLE FREE REGISTER LIST HAVING SELECTED POINTERS MOVING IN UNISON

(75) Inventors: Spencer M. Gold, Pepperell, MA (US);
Julie M. Staraitis, Ayer, MA (US);
Jason Eisenberg, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 589 days.

(21) Appl. No.: 09/881,071

(22) Filed: Jun. 13, 2001

(65) Prior Publication Data

US 2002/0194455 A1 Dec. 19, 2002

(51) Int. Cl.
*G06F 9/50* (2006.01)
(52) U.S. Cl. ...................................... 712/217
(58) Field of Classification Search ................ 712/23, 712/228, 218, 227, 217
See application file for complete search history.

(56) References Cited

U.S. PATENT DOCUMENTS

| 5,109,495 | A | * | 4/1992 | Fite et al. ................... 712/207 |
| 5,546,554 | A | * | 8/1996 | Yung et al. .................. 711/203 |
| 5,613,151 | A | * | 3/1997 | Dockser ..................... 711/202 |
| 5,758,112 | A | * | 5/1998 | Yeager et al. ............... 712/217 |
| 6,092,175 | A |   | 7/2000 | Levy et al. .................... 712/23 |
| 6,108,711 | A | * | 8/2000 | Beck et al. ................. 709/242 |
| 6,108,771 | A | * | 8/2000 | Gaertner et al. ............ 712/217 |
| 6,314,511 | B1 | * | 11/2001 | Levy et al. ................. 712/217 |
| 6,330,661 | B1 | * | 12/2001 | Torii .......................... 712/228 |
| 6,425,072 | B1 | * | 7/2002 | Meier et al. ................ 712/218 |
| 6,889,319 | B1 | * | 5/2005 | Rodgers et al. ............. 712/228 |

FOREIGN PATENT DOCUMENTS

WO      WO 96/12228 A1    4/1996
WO      WO 9612228 A1  *  4/1996

OTHER PUBLICATIONS

Jerry M Rosenberg, Dictionary of Computers, Information Processing & Telecommunications, 1987, John Wiley & Sons, 2nd Edition, p. 470.*
S. Wallace, B. Calder, and D. M. Tullsen. "Threaded multiple path execution" In: 25th Annual International Symposium on Computer Architecture, pp. 238-249, Jun. 1998.

* cited by examiner

*Primary Examiner*—Eric Coleman
(74) *Attorney, Agent, or Firm*—Lahive & Cockfield, LLP

(57) ABSTRACT

A method and apparatus is provided for restoring a free physical register list to its previous state without having to physically restore any data. The method and semiconductor device utilizes sets of pointers to manage physical register pointers in the physical register list. The physical register list is able to independently track physical registers for multiple threads of a multithreading microprocessor.

50 Claims, 4 Drawing Sheets

FLUSHABLE FREE REGISTER LIST HAVING SELECTED POINTERS MOVING IN UNISON

TECHNICAL FIELD OF THE INVENTION

The present invention generally relates to microprocessors and more particularly, to a method for managing physical registers.

BACKGROUND ON THE INVENTION

High performance microprocessors, may use out-of-order instruction execution rather than conventional sequential execution that requires all instructions to execute in sequential order. As such, if the next sequential instruction does not have all of its operands in a valid state, the instruction pipeline stalls until the operands become valid. In contrast, an out-of-order microprocessor executes instructions as soon as its operands become valid, independent of the original instruction sequence. Consequently, as these high performance microprocessors execute out-of-order instructions, the microprocessors generate numerous temporary register results. The temporary values are stored together with permanent values in register files. The temporary values become permanent values when the corresponding instructions are retired. An instruction is retired when the temporary result becomes the new state of the microprocessor.

To ensure that each instruction is provided with the correct operand value, each logical register number referenced in the instruction is mapped to a physical register. Each time a new value is placed in a logical register, the logical register is assigned to a new physical register. As a result, each physical register holds a single permanent or temporary value. In this manner, data dependency issues commonly associated with out-of-order instruction execution are avoided.

Since these high performance microprocessors perform out-of-order execution, an instruction can change its register value before all of the prior instructions complete. However, if any of the prior instructions cause an exception, all of the sequential instructions prior to the time the exception occurred are flushed. As a result, the registers allocated to the instructions being flushed become available for allocation to newly decoded instructions.

Typically, a free register list contains just enough capacity to track the maximum allowable number of free physical registers. When physical registers are assigned to an instruction a vacancy is created in the free register list that is immediately filled with a pointer to the physical register that will become free once that instruction retires. Consequently, the typical free register list does not store pointers to physical registers that were recently assigned to an incoming instruction. Hence, when it becomes necessary to process a flush, it is the contents of the free register list that must be restored to a prior state, not the registers in the physical register file. Unfortunately, this method is burdensome and time consuming because it requires at least two additional operations to restore a free physical register list to its previous state.

SUMMARY OF THE INVENTION

The illustrative embodiment of the present invention addresses the above-described limitations of the conventional methods for restoring a free physical register list to a previous state. The illustrative embodiment provides an approach that allows an instruction pipeline flush to occur without having to physically restore register values. Moreover, the illustrative embodiment prevents the physical register pointers pointing to the physical registers that are temporarily or speculatively assigned as a destination operand for a instruction from being overwritten with physical register pointers to registers that will soon become free.

In a first embodiment of the present invention, a method for register allocation is performed in a microprocessor performing speculative instruction execution. A data structure that includes a free physical register list to track physical register allocation for an independent program execution stream or a thread of the microprocessor is provided. The free physical register includes a set of managing pointers that include a read row pointer, a write row pointer, and a retire pointer. The managing pointers operate to identify the locations of physical registers available for assignment as designation registers, the location of physical registers speculatively allocated as destination registers for a set of instructions, and the locations of physical registers allocated to instructions that are about to be retired. As such, the speculatively allocated physical registers for a speculative instruction set can be restored to their previous state when the microprocessor issues a flush operation by moving the read row pointer to the first speculatively allocated physical register for the flushed instruction bundle.

In another embodiment of the present invention, a method for register allocation is performed in a multithreading microprocessor performing speculative instruction execution. A data structure that includes a free physical register list for each thread of the multithreading microprocessor that independently track physical register allocation for a first thread and independently track physical register allocation for a second thread is provided. The free physical register list for the first thread includes a first set of managing pointers that include a read row pointer, a write row pointer, and a retire pointer. In similar fashion, a second set of managing pointers that include a read row pointer, a write row pointer, and retire row pointer manage physical register allocation for the second thread. The managing pointer sets are independent of one another and therefore independently track the physical registers available for assignment as designation operands for the first thread and for the second thread of the multithreading microprocessors. The managing pointers operate to identify the locations of physical registers available for assignment as designation registers, the location of physical registers speculatively allocated as destination registers for a set of instructions, and the locations of physical registers allocated to instructions that are about to be retired. As such, the speculatively allocated physical registers for a speculative set of instructions can be restored to their previous state when the multithreading microprocessor issues a flush operation by moving the read row pointer associated with the thread being flushed to the first speculatively allocated physical register for the flushed instruction set.

The above described approach benefits a microprocessor architecture that processes speculative data because the physical register list is quickly restored to a previous state without having to physically restore any data. In addition, the use of two sets of row pointers to manage register pointers allows an instruction bundle from one thread of the microprocessor to be flushed without disturbing operation of other threads of the microprocessor. Moreover, each managing pointer set is structured to prevent the speculatively allocated physical register pointer from being overwritten with a physical register pointer allocated to an instruction that is about to be retired.

In accordance with another aspect of the present invention, a semiconductor device having multiple physical registers that are assigned as destination operands for instructions to be executed by a microprocessor includes a module that provides a structure for holding information that identifies the physical registers that are available for holding the destination operand. The information identifying the available physical registers is managed by a set of row pointers. The set of row pointers identify the available physical registers for a thread of a microprocessor. The set of managing row pointers includes a read pointer, a write pointer and a retire pointer. In the pointer set, the read pointer and the write pointer are at a fixed distance from each other and traverse the data structure in unison. Moreover, the starting location of the physical registers speculatively assigned as destination operands for a set of instructions is determined by subtracting from the position of the retire pointer the fixed distance between the read pointer and the write pointer while the ending location of the physical registers speculatively assigned as an operand destination for an instruction set is determined by the read pointer.

In accordance with yet another aspect of the present invention, a semiconductor device having multiple physical registers that are assigned as destination operands for instructions to be executed by a microprocessor includes a module that provides a structure for holding information that identifies the physical registers that are available for holding the destination operands. The information identifying the available physical registers is managed by two sets of row pointers that operate independently of one another. The first set of row pointers identify the available physical registers for a first thread of a multithreading microprocessor and the second set of pointers identifies the available physical registers for a second thread of the multithreading microprocessor. Each set of managing row pointers includes a read pointer, a write pointer and a retire pointer. In each pointer set, the read pointer and the write pointer are at a fixed distance from each other and traverse the data structure in unison. Moreover, the starting location of the physical registers speculatively assigned as destination operands for a set of instructions is determined by subtracting from the position of the retire pointer the fixed distance between the read pointer and the write pointer while the ending location of the physical registers speculatively assigned as an operand destination for a set of instructions is determined by the read pointer.

In accordance with yet another embodiment of the present invention, a computer readable medium holding computer executable instructions provides a method for tracking physical registers in a structure holding information identifying physical registers that are free to be assigned as destination operands for instructions executing on a microprocessor. The destination operand identifies where data resulting from an executed instruction is to be stored. The method allows a set of pointers to manage the physical registers for a thread of the microprocessor. The set of pointers includes a read pointer to indicates a free or available register, a write pointer that indicates where an assigned physical register corresponding to a soon-to-be retired instruction should be written and a retire pointer that indicates a physical register corresponding to an instruction that is the next instruction to be retired. Should the read pointer advance to within a predetermined number rows of the retire pointer, a stall condition may be initiated to prevent the assignment of registers that are not yet free. The stall condition persists until the retire pointer is moved a sufficient distance away from the read pointer to enable further assignment of free registers. Moreover, the state of the structure may be restored when an instruction pipeline flush occurs by resetting the read pointer to point to the physical register allocated to the just flushed instruction

BRIEF DESCRIPTION OF THE DRAWINGS

An illustrative embodiment of the present invention will be described below relative to the following drawings.

DETAILED DESCRIPTION

The illustrative embodiment of the present invention provides a method and a semiconductor device for increasing the efficiency of restoring a free physical register list to its preexisting state following an instruction flush request. In the illustrative embodiment, the physical register list stores and maintains the pointers to the multiple physical integer registers that are currently available for use as destination registers for a newly fetched instruction of a multi threaded microprocessor. The physical register list stores and maintains this information for the threads of the microprocessor. The physical register list may be restored to a preexisting state following a flush request by independently resetting a read row pointer to the physical register pointer assigned to the flushed instruction. As a result, temporary or speculatively assigned physical registers will be immediately reused by newly incoming instructions following a flush request, which enables more efficient use of the processor's physical register resources. Furthermore, the free register list is organized such that the prior state of the free register list necessary for correctly processing a flush request is certain to remain within the free register list, which eliminates the need for restoring this state from a separate memory device.

The ability to prevent the overwriting of physical register pointers that have been speculatively assigned to incoming instructions ensures that the free register list can be restored to its previous state. The free physical register list of the illustrative embodiment utilizes twice as many rows as the maximum number of free physical registers. In this manner, the read pointer and the write row pointer are able to be set apart at a fixed distance and moved in unison to prevent overwriting of pointers to physical registers that are allocated to instructions that have not yet retired.

In the illustrative embodiment, the method and semiconductor device are attractive for use for simultaneous multithreading processors. As a result, processor performance is increased by avoiding having to physically reset the free physical register pointer values to their previous state upon an instruction pipeline flush. Thus, pointers to all physical registers allocated to instructions that have not yet retired are protected from being overwritten until the instructions commit and the temporary results are retired as the new state of the processor.

Figure 1:
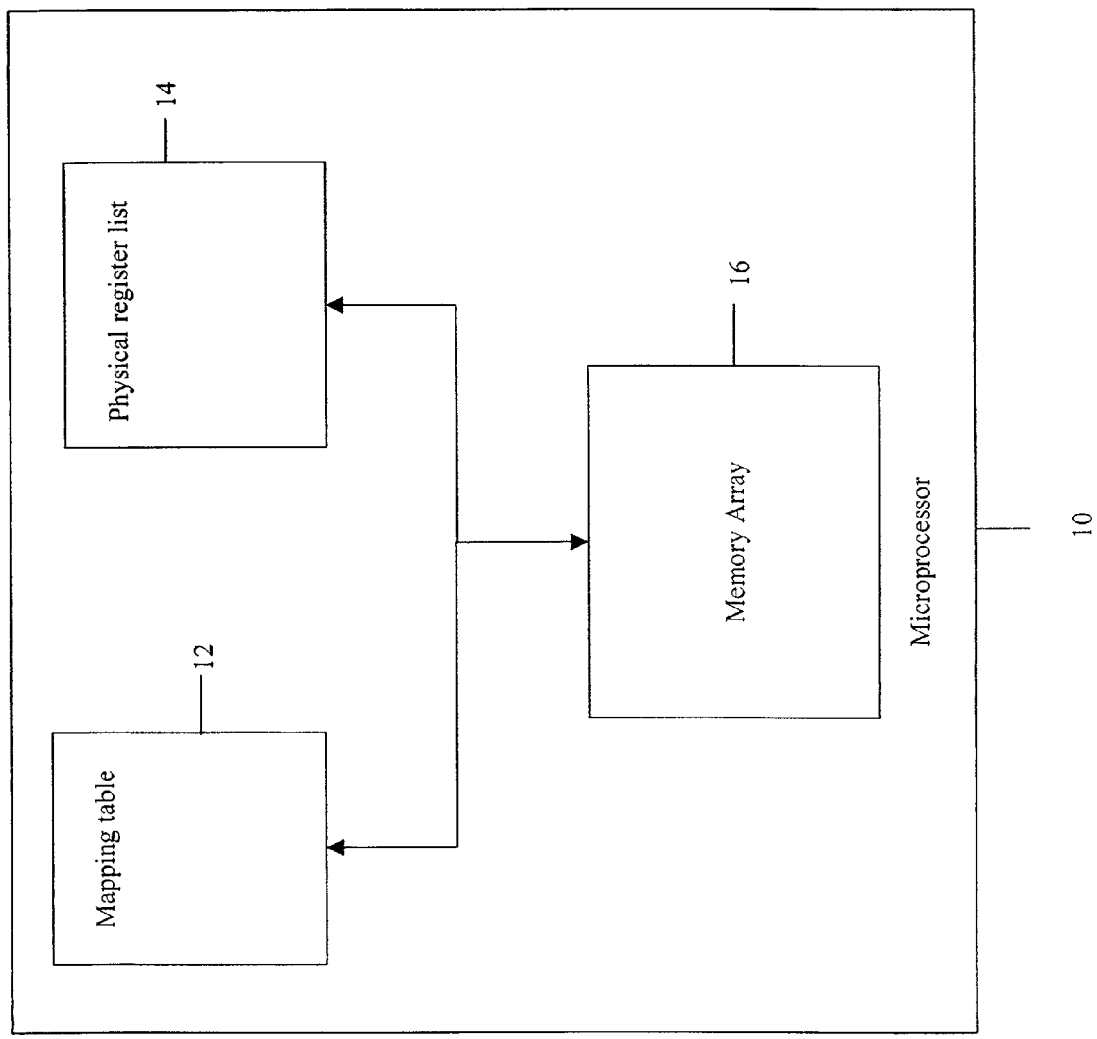
FIG. 1 is a block diagram illustrating a microprocessor suitable for practicing the illustrative embodiment of the present invention.

FIG. 1 illustrates a microprocessor suitable for practicing the illustrative embodiment. The microprocessor 10 includes a mapping table 12, a physical register list 14, and a memory array 16. The microprocessor 10 is adapted for simultaneous multithreading and may execute instructions out-of-order.

The mapping table 12 operates to map a logical register to a physical register when the instruction is being decoded. The physical register list 14 stores and maintains pointers to the physical integer registers that are currently available or soon to be available for use as a destination register of a just fetched instruction. The microprocessor 10 in the illustrative embodiment is a dual threaded processor. Nevertheless, those skilled in the art will appreciate that the microprocessor need not be a dual-threaded microprocessor, but rather maybe a microprocessor having more than two threads. The physical register list stores and maintains pointers to physical integer registers for both threads. Nevertheless, those skilled in the art will recognize that the physical register list 14 may store and maintain pointers to physical integer registers for a single-thread of a single threaded microprocessor.

Since the microprocessor 10 is capable of out-of-order instruction execution, the microprocessor 10 generates numerous speculative or temporary register results. These speculative values are stored in a physical register together with permanent values from previously retired instructions. An instruction is considered retired when the temporary value of the physical register is committed as the new state of the processor. An instruction can retire only after all previous instructions have been successfully retired.

To ensure that each decoded instruction is given the correct operand value, the logical register number used in the instruction is mapped by the mapping table 12 to a physical register pointer in the physical register list 14. Each time a new value is placed in a logical register, a new physical register is assigned to the logical register by the mapping table 12. Consequently, each physical register holds only a single speculative value. Upon the instruction being retired, the new permanent value in the physical register is written to the memory array 16.

Figure 2:
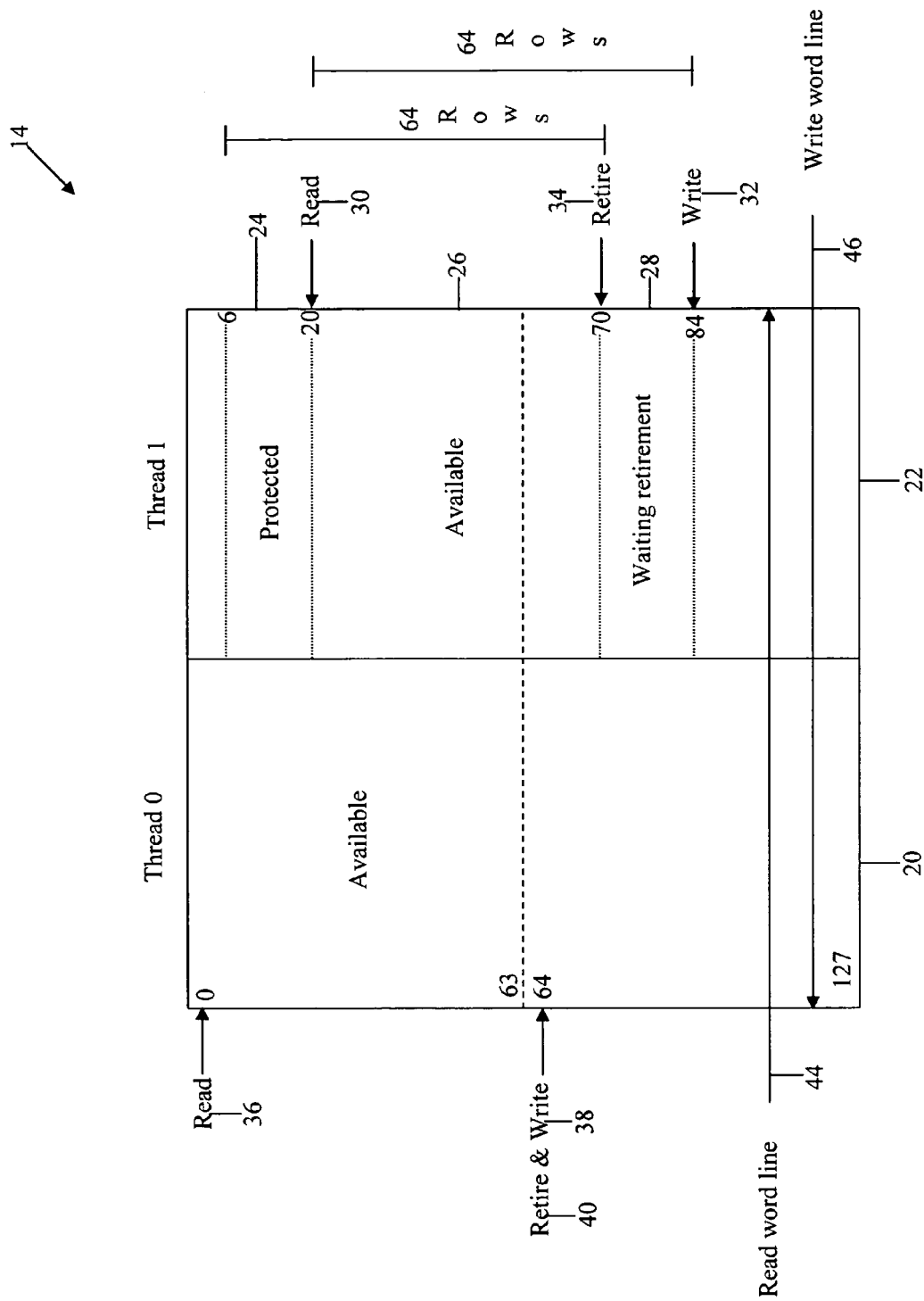
FIG. 2 depicts a physical register list that is suitable for practicing the illustrative embodiment of the present invention.

As illustrated in FIG. 2, the physical register list 14 of the illustrative embodiment is organized as a modulo-eight (8), dual ported (one read and one write) register file structure with 128 rows and 16 columns. The modulo-eight (8) organization allows eight rows of data to be read in each read cycle even though the register file has a single read port. Those skilled in the art will recognize that the number of rows and columns of the physical register list can be extended to include additional rows and additional columns or can be reduced in size to include fewer than 128 rows and 16 columns.

The physical register list 14 tracks available physical registers for a first thread (thread 0) in a first portion 20 of the physical list register 14 and tracks the available physical registers for a second thread (thread 1) in a second portion 22 of the physical register list 14. Each portion 20 and 22 of the physical register list 14 include an independent set of pointers to manage the allocation of free physical registers. The operation of each set of pointers is discussed below in more detail.

Read row pointer 36, write row pointer 38, and retire row pointer 40 function to manage the first portion 20 of the physical register list 14. In like fashion, read row pointer 30, write row pointer 32, and retire row pointer 34 manage the second portion 22 of the physical register list 14. Read row pointer 36 and write row pointer 38 are set apart at a fixed distance from one another and move up and down the first portion 20 in unison. The number of rows between the read row pointer 36 and the write row pointer 38 is determined by the number free or available physical integer register pointers that the physical register list 14 is designed to manage. Those skilled in the art will recognize that the number of available physical integer register locations in the physical register list 14 is driven by the need of the microprocessor 10. In the illustrative embodiment of the present invention, the read row pointer 30 and the write row pointer 38 are sixty-four (64) rows apart. The retire row pointer 40 travels independently of the read row pointer 36 and the write row pointer 38.

In similar fashion, the read row pointer 30 and write row pointer 32 of the second portion 22 of the physical register file 14 are also set apart by a fixed number of rows, and move up and down the file structure in unison. Likewise, the retire row pointer 34 moves independently of the read row pointer 30 and the write row pointer 32.

The physical register list 14 includes the read word line 44 to read data in a particular row of the first portion 20 or the second portion 22 of the structure. The physical register list 14 also includes the write word line 46 to write data into a particular row of either the first portion 20 or the second portion 22 of the physical register 14. Moreover, because the physical register list 14 is implemented as a modulo-eight (8) structure, the physical register list 14 allows up to eight rows of data to be read in each read cycle although the physical register list 14 has a single read port 44. Thus, the physical register list 14 is capable of providing up to eight physical register pointers to the microprocessor 10 with a single read. Those skilled in the art will recognize that the physical register list 14 is capable of providing fewer than eight physical register pointers with a single read, for example one physical register pointer.

As illustrated, the read row pointer 30 and the read row pointer 36 each indicate the next available physical register pointer that is available for assignment as a destination operand of a logical register. The read row pointer 30 corresponds to the second portion 22 of the structure and the read row pointer 36 corresponds to the first portion 20 of the structure. The write row pointer 32 and the write row pointer 38 each indicate where a physical register pointer should be written for a physical register holding an operand value corresponding to a logical register soon to be overwritten by an instruction in the pipeline and thus become a free register once that instruction is retired. The write row pointer 32 corresponds to the second portion 22 of the structure and the write row pointer 38 corresponds to the first portion 20 of the physical register list 14. The retire row pointer 34 and the retire row pointer 40 point to in each of their respective portions 22 and 20 of the physical register list 14, the physical register pointer of a physical register assigned to an instruction that is the next instruction to be retired by the microprocessor 10.

During initialization of the physical register list 14 the read row pointers 30, and 36 are set to row zero and the write row pointers 32 and 38 along with the retire row pointers 34, and 40 are set to row sixty-four of the physical register list 14. Thus, after initialization of the physical register list 14, the available physical registers are indicated by the physical register pointers located in row zero through row sixty-three of the first portion 20 and the second portion 22 of the physical register list 14.

The protected register region 24 of the second portion 22 holds values identifying the physical register pointers that are allocated to instructions having a logical destination register that have been decoded and issued but have not yet retired. The physical registers referenced to by the pointers in the protected region 24 hold the speculative or uncommitted data values generated by the instructions that have not yet retired. The available region 26 of the second thread portion 22 indicates the register pointers for the physical registers that are available to be allocated as a destination operand for instructions yet to be fetched and decoded by the microprocessor 10. The available region 26 is determined by the location of the read row pointer 30 and the location of the retire row pointer 34 along the first portion 22 of the physical register list 14. The waiting retirement region 28 of the first portion 22 indicates the physical register pointers of the physical registers corresponding to logical registers soon to be overwritten by instructions in the pipeline. Once these instructions are retired, the data values being stored in these registers become obsolete, and therefore become available registers. The row location of the retire row pointer 34 is sixty-four rows down from the first row in the protected region 24. The first portion 20 of the physical register list 14 also includes a protected region and a waiting retirement region although not illustrated in FIG. 2 because the first portion 20 illustrates the initialization state and the second portion 22 illustrates a working state of the physical register list 14.

Figure 3:
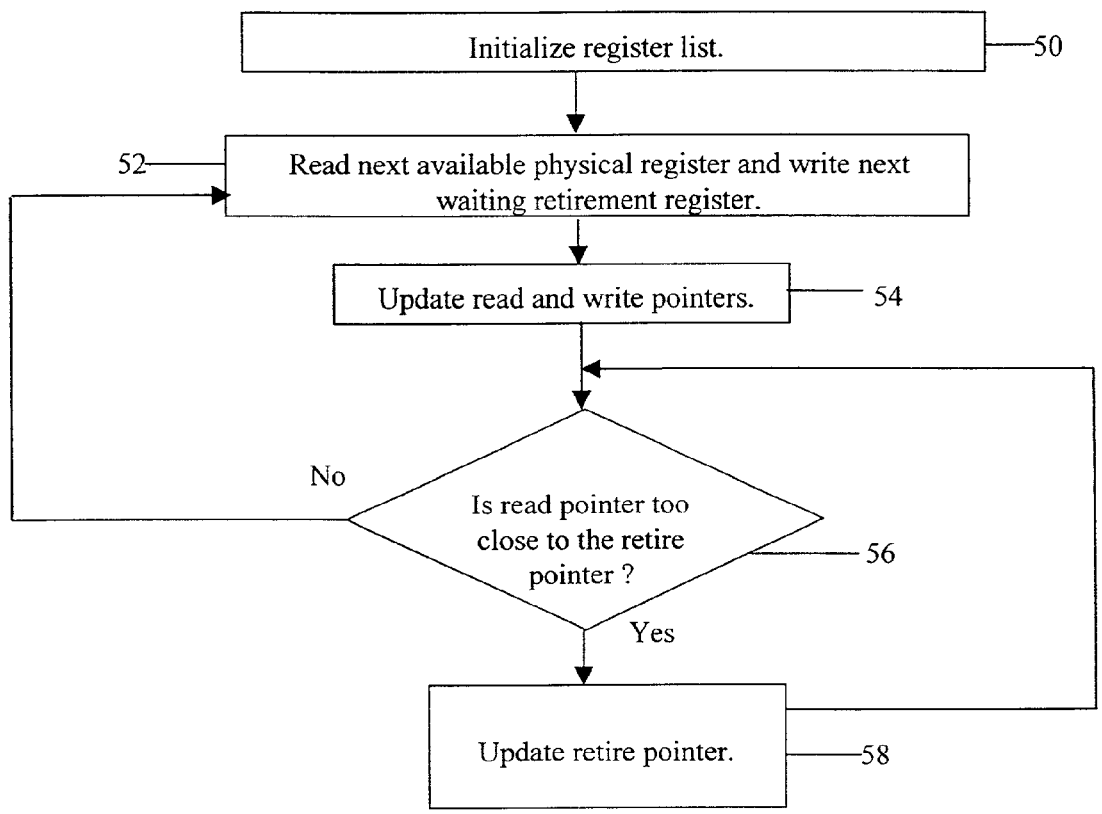
FIG. 3 is a flow chart illustrating the steps taken to allocate free physical registers.
Figure 4:
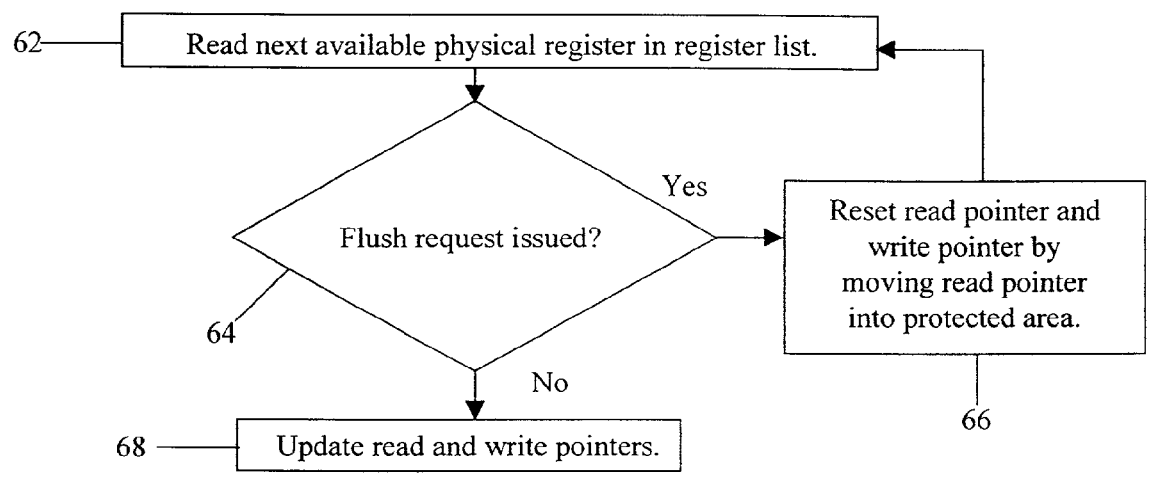
FIG. 4 is a flow chart illustrating the steps taken to process a flush request.

With reference to FIG. 2 and FIG. 3, the utilization of the read row pointer 30, the write row pointer 32 and the retire row pointer 34 will be discussed below. In addition, FIG. 2 and FIG. 4 illustrate the processing of a flush request without having to physically restore any physical register values. For ease of the discussion below, the description of the pointer set utilization and the description of the flush operation will be discussed with reference to the second thread portion 22 of the physical register list 14. The first thread portion 20 and the second thread portion 22 of the physical register list 14 operate independently of one another to read, write, and retire physical register pointers and also operate independently to process a requested flush operation. As such, the discussion below will focus on the second thread portion 22. Those skilled in the art will recognize that in discussing the second thread portion 22 in relation to an instruction flush request is not meant to be limiting of the present invention, but meant to merely ease the explanation of the flush operation itself.

Upon initialization of the physical register list 14, the read row pointer 30 points to row zero and the write row pointer 32 and the retire row pointer 34 point to row sixty-four of the second threaded portion 22 of the physical register list 14 (step 50 in FIG. 3). After an instruction is fetched and decoded that includes a logical destination register, the microprocessor 10 reads the physical register pointer that the read row pointer 30 points to and assigns the corresponding physical register to the logical register as a destination register to identify where data resulting from an operation is to be stored (step 52 in FIG. 3). At about the same time, the pointer to the physical register last allocated to the logical register of the just fetched and decoded instruction is written into the free register list at the location pointed to by the write pointer (step 52 in FIG. 3). At this point, the read row pointer 30 and the write row pointer 32 are updated and moved down one row in the second thread portion 22 of the physical register list 14, and the just read physical register pointer becomes part of the protected region 24 (step 54 in FIG. 3). The protected region 24 is defined as the rows between the read row pointer 30 and the row that is the fixed distance between the read and write pointers subtracted from the retire pointer on the other end. For example, in FIG. 2, the protected region 24 includes rows six through nineteen of the first threaded portion 22.

In addition, in order for an out-of-order processor to support precise exceptions, it must retire instructions in the same order that they were fetched, i.e., in program order. Thus, the destination registers of instructions become available in the same order that they were assigned. As such, each time an instruction retires, the free register list moves the retire row pointer 34 down a row, which indicates that the contents of the physical register previously pointed to by the retire pointer are obsolete and can be safely overwritten.

If during the update the read row pointer 30 comes within a predetermined number of rows of the retire row pointer 34, a stall condition exists (step 56 in FIG. 3). The stall condition exists when the read row pointer 30 gets too close to the retire row pointer 34 indicating that the available region 26 may be too small to provide an adequate number of destination registers for the next set of instructions. Consequently, the microprocessor 10 stalls, meaning that it stops fetching instructions until more registers are added to the available region 26. To cure the stall condition, the microprocessor 10 allows instructions in the pipeline to retire, which advances the retire row pointer 34 towards the write row pointer 32 and away from the read row pointer 30 (step 58 in FIG. 3). When enough instructions have retired to make the available region 26 sufficiently large, the microprocessor 10 may continue to fetch new instructions and the stall condition concludes. The predetermined distance typically corresponds to the number of instructions the microprocessor 10 can fetch in a single cycle. In the illustrative embodiment, the predetermined unsafe distance between the read row pointer 30 and the retire row pointer 34 is eight rows because the microprocessor 10 can fetch of up to eight instructions in a single cycle. If there is a sufficient number of rows between the read row pointer 30 and the retire row pointer 34 a stall condition does not exist and the physical register pointers in the available region 26 may be read and allocated as destination operand locations for logical registers (step 52 in FIG. 3).

If during the update the read row pointer 30 comes within a predetermined number of rows of the retire row pointer 34, a stall condition exists (step 56 in FIG. 3). The stall condition exists when the read row pointer 30 gets too close to the retire row pointer 34 indicating that the available region 26 may be too small to provide an adequate number of destination registers for the next set of instructions. Consequently, the microprocessor 10 stalls, meaning that it stops fetching instructions until more registers are added to the available region 26. To cure the stall condition, the microprocessor 10 allows instructions in the pipeline to retire, which advances the retire row pointer 34 towards the write row pointer 32 and away from the read row pointer 30 (step 58 in FIG. 3). When enough instructions have retired to make the available region 26 sufficiently large, the microprocessor 10 may continue to fetch new instructions and the stall condition concludes. The predetermined distance typically corresponds to the number of instructions the microprocessor 10 can fetch in a single cycle. In the illustrative embodiment, the predetermined unsafe distance between the read row pointer 30 and the retire row pointer 34 is eight rows because the microprocessor 10 can fetch of up to eight instructions in a single cycle. If there is a sufficient number of rows between the read row pointer 30 and the retire row pointer 34 a stall condition does not exist and the physical register pointers in the available region 26 may be read and allocated as destination operand locations for logical registers (step 62 in FIG. 4).

Those skilled in the art will recognize that the microprocessor 10 can issue a flush request at any point during instruction execution and cause the read and write row pointers to be reset. Moreover those skilled in the art will appreciate that the physical registers indicated by the register pointers in the protected region 24 cannot be overwritten with a temporary value because if the read row pointer 30 is within the predefined limits of the protected region, the retire row pointer 34 and the write row pointer 32 are also within the same predefined limit and a stall condition exists. The stall condition may be resolved by retiring physical register pointers, that is making them available for assignment as a destination operand location for a logical register or a flush request may be processed to return the physical register list to its previous state.

While the present invention has been described with reference to a preferred embodiment thereof, one skilled in the art will appreciate that various changes in form and detail may be made without departing from the intended scope of the present invention as defined in the pending claims. For example, the physical register list can track more than two threads or the register file list may track thirty-two physical registers or may have thirty-two columns.

What is claimed:

1. In a microprocessor performing speculative instruction execution, a method comprising the steps of:
providing a structure to track register allocation for a first thread of said microprocessor; and
tracking a first set of pointers in said structure assigned to manage said register allocation for an instruction of said first thread of said microprocessor to prevent a register allocated as a destination operand for said instruction of said first thread from being overwritten before said instruction of said first thread retires, said first set of pointers includes at least two pointers set apart by a fixed distance and move in unison, at all times, up and down said structure.

2. The method of claim 1, further comprising the step of tracking a second set of pointers in said structure assigned to manage a register allocation for an instruction of a second thread of said microprocessor to prevent a register allocated as a destination operand for said instruction of said second thread from being overwritten before said instruction of said second thread retires, whereby said first set of pointers and said second set of pointers track independently of each other.

3. The method of claim 1, wherein said structure comprises pointers to said registers allocated and pointers to registers deallocated, where said registers allocated and said registers deallocated are physical registers that operate as a destination operand for said instructions executing on a multithreading microprocessor where said destination operands identifies where data resulting from logical operations are to be written.

4. The method of claim 1, wherein said first set of pointers comprises a read pointer, a write pointer, and a retire pointer where said read and write pointers are set apart by a fixed distance and move in unison, at all times, up and down said structure.

5. The method of claim 2, wherein said second set of pointers comprises a read pointer, a write now pointer, and a retire pointer where said read and write pointers are set apart by a fixed distance and move in unison, at all times, up and down said structure.

6. The method of claim 4, wherein said read pointer of said first set of pointers indicates said physical register location awaiting said register allocation as said destination operand to identify where data should be written when said instruction of said first thread is executed by said microprocessor.

7. The method of claim 4, wherein said write pointer of said first set of pointers indicates said physical register location of said register allocated as said destination operand to identify where data should be written for said instruction of said first thread that committed.

8. The method of claim 4, wherein said retire pointer of said first set of pointers indicates said physical register location of said register allocated as said destination operand for said instruction of said thread that is next to be retired.

9. The method of claim 5, wherein said read pointer of said second set of pointers indicates said physical register location awaiting said register allocation as said destination operand to identify where data should be written when said instruction of said second thread is executed by said microprocessor.

10. The method of claim 5, wherein said write pointer of said second set of pointers indicates said physical register location of said register allocated as said destination operand to identify where data should be written for said instruction of said second thread that committed.

11. The method of claim 5, wherein said retire pointer of said second set of pointers indicates said physical register location of said register allocated as said destination operand for said instruction of said second thread that is next to be retired.

12. The method of claim 4, wherein the number of physical register pointers between said read pointer and said retire pointer of said first set of pointers indicates said physical registers available for said register allocation for said first thread of said microprocessor.

13. The method of claim 5, wherein the number of physical register pointers between said read pointer and said retire pointer of said second set of pointers indicates said physical registers available for said register allocation for said second thread of said microprocessor.

14. The method of claim 4, wherein the number of physical register pointers between said retire pointer and said write pointer of said first set of pointers indicates said registers allocated to said destination operand for a plurality of instructions of said first thread that are to become available for reallocation upon retirement of said plurality of instructions.

15. The method of claim 5, wherein the number of physical register pointers between said retire pointer and said write pointer of said second set of pointers indicates said physical registers allocated to said destination operand for a plurality of instructions of said second thread that are to become, available for reallocation upon retirement of said plurality of instructions.

16. The method of claim 4, wherein said register allocated for said plurality of instructions of said first thread of said microprocessor that have not yet committed is defined by the number of physical register pointers bounded by said read pointer and said retire pointer minus said fixed distance between said read pointer and said write pointer of said first set of pointers.

17. The method of claim 5, wherein said register allocated for said plurality of instructions of said second thread of said microprocessor that have not yet committed is defined by the number of physical register pointers bounded by said read pointer and said retire pointer minus said fixed distance between said read pointer and said write pointer of said second set of pointers.

18. The method of claim 1, wherein said method of register allocation is performed in a modulo-8 memory array.

19. The method of claim 16, further comprising the step of restoring said register allocated for said instruction of said first thread of said microprocessor that has not yet committed to its previous state in said first thread of said microprocessor by pointing said read pointer of said first set of pointers to said physical register pointer allocated to said physical register location corresponding to said instruction being flushed by said microprocessor.

20. The method of claim 17, further comprising the step of restoring said register allocated for said instruction of said second thread of said microprocessor that has not yet committed to its previous state in said second thread of said microprocessor by pointing said read pointer of said second set of pointers to said physical register pointer allocated to said physical register location corresponding to said instruction being flushed by said microprocessor.

21. In a multithreading microprocessor performing speculative instruction execution, a method comprising the steps of:
providing a single structure to track register allocation for a first thread and a second thread of said multithreading microprocessor;
tracking a first set of pointers in said structure assigned to manage said register allocation for an instruction of said first thread of said multithreading processor to prevent a register allocated as a destination operand for said instruction of said first thread from being overwritten before said instruction of said first thread retires; and
tracking a second set of pointers in said structure assigned to manage said register allocation for an instruction of said second thread of said multithreading processor to prevent a register allocated as a destination operand for said instruction of said second thread from being overwritten before said instruction of said second thread retires, whereby said first set of pointers and said second set of pointers track independently of each other.

22. A semiconductor device having a plurality of physical registers that are assigned as destination registers for instructions to be executed by a microprocessor performing out-of-order execution, comprising:
a first module providing a structure for holding information identifying available physical registers for said microprocessor;
a first set of register pointers assigned to a first portion of said structure to track said physical registers assigned as said destination registers for a first thread of said microprocessor, said first set of register pointers includes a retire row pointer to identify where a pointer pointing to at least one of said plurality of physical registers assigned as a destination register for an instruction in said first thread that is next to be retired and a read pointer to identify where a pointer pointing to an available physical register available for assignment as a destination operand for an instruction for said first thread, wherein when said microprocessor issues a flush request for said instruction in said first thread, moving said read pointer of said first set of register pointers to said physical register assigned as said destination register for said instruction being flushed in said first thread to restore said physical register to a previous state.

23. The semiconductor device of claim 22, further comprising a second set of register pointers assigned to a second portion of said structure to track said physical registers assigned as said destination registers for a second thread of said microprocessor and when said microprocessor issues a flush request for an instruction in said second thread, moving a read pointer of said second set of register pointers to said physical register assigned as said destination register for said instruction being flushed in said second thread to restore said physical register to a previous state.

24. The semiconductor device of claim 22, wherein said structure comprises a free physical register list for said identification of said available physical requests for said microprocessor.

25. The semiconductor device of claim 23, wherein said first set of register pointers move independently of said second set of register pointers, wherein said first set of register pointers identify said physical registers assigned to instructions in said first thread of said microprocessor that have not been committed and said second set of register pointers identify said physical registers assigned to instructions in said second thread of said microprocessor that have not been committed.

26. The semiconductor device of claim 22, wherein said first set of register pointers further comprises, a write row pointer, wherein said write row pointer identifies where a pointer pointing to said physical register of an instruction in said first thread should be written when said instruction commits.

27. The semiconductor device of claim 23, wherein said second set of register pointers further comprises, a write row pointer and a retire row pointer, wherein said write row pointer identifies where a pointer pointing to said physical register of an instruction in said second thread that is committed should be written, and said retire row pointer identifies where a pointer pointing to said physical register of an instruction in said second thread that is next to be retired.

28. A semiconductor device having a plurality of physical registers that are assigned as destination registers for instructions to be executed by a microprocessor performing out-of-order execution, comprising:
a first module providing a structure for holding information identifying available physical registers for said microprocessor;
a first set of register pointers assigned to a first portion of said structure to track said physical registers assigned as said destination registers for a first thread of said microprocessor and when said microprocessor issues a flush request for an instruction in said first thread, moving a read pointer of said first set of register pointers to said physical register assigned as said destination register for said instruction being flushed in said first thread to restore said physical register to a previous state; and
a second set of register pointers assigned to a second portion of said structure to track said physical registers assigned as said destination registers for a second thread of said microprocessor and when said microprocessor issues a flush request for an instruction in said second thread, moving a read pointer of said second set of register pointers to said physical register assigned as said destination register for said instruction being flushed in said second thread to restore said physical register to a previous state.

29. A computer readable medium holding computer executable instructions for performing a method in a microprocessor performing speculative instruction execution, said method comprising the steps of:

providing a structure to track register allocation for a first thread of said microprocessor; and tracking a first set of pointers in said structure assigned to manage said register allocation for an instruction of said first thread of said microprocessor to prevent a register allocated as a destination operand for said instruction of said first thread from being overwritten before said instruction of said first thread retires, said first set of pointers includes a first pointer and a second pointer always set apart by a fixed distance and move in unison, at all times, up and down said structure.

30. The computer readable medium of claim 29 further comprising the step of tracking a second set of pointers in said structure assigned to manage said register allocation for an instruction of a second thread of said microprocessor to prevent a register allocated as a destination operand for said instruction of said second thread from being overwritten before said instruction of said second thread retires, whereby said first set of pointers and said second set of pointers track independently of each other.

31. The computer readable medium of claim 29, wherein said structure comprises pointers to said registers allocated and pointers to registers deallocated, where said registers allocated and said registers deallocated are physical registers that operate as a destination operands for said instruction of said first thread executing on said microprocessor where said destination operands identifies where data resulting from logical operations are to be written.

32. The computer readable medium of claim 29, wherein said first set of pointers further comprises a read pointer, a write pointer, and a retire pointer wherein said read pointer and said write pointer are set apart by a fixed distance and move in unison, at all times, up and down said structure.

33. The computer readable medium of claim 30, wherein said second set of pointers comprises a read pointer, a write pointer, and a retire pointer wherein said read pointer and said write pointer are set apart by a fixed distance and move in unison, at all times, up and down said structure.

34. The computer readable medium of claim 32, wherein said read pointer of said first set of pointers indicates said physical register location awaiting said register allocation as said destination operand to identify where data should be written when said instruction of said first thread is executed by said microprocessor.

35. The computer readable medium of claim 32, wherein said write pointer of said first set of pointers indicates said physical register location of said register allocated as a said destination operand to identify where data should be written for said instruction of said first thread that committed.

36. The computer readable medium of claim 32, wherein said retire pointer of said first set of pointers indicates said physical register location of said register allocated as a said destination operand for said instruction of said first thread that is next to be retired.

37. The computer readable medium of claim 33, wherein said read pointer indicates said physical register location awaiting said register allocation as said destination operand to identify where data should be written when said instruction of said second thread is executed by said microprocessor.

38. The computer readable medium of claim 33, wherein said write pointer of said first set of pointers indicates said physical register location of said register allocated as a said destination operand to identify where data should be written for said instruction of said second thread that committed.

39. The computer readable medium of claim 33, wherein said retire pointer of said first set of pointers indicates said physical register location of said register allocated as a said destination operand for said instruction of said second thread that is next to be retired.

40. The computer readable medium of claim 32, wherein the number of physical register pointers between said read pointer and said retire pointer of said first set of pointers indicates said physical registers available for said register allocation for said first thread of said microprocessor.

41. The computer readable medium of claim 33, wherein the number of physical register pointers between said read pointer and said retire pointer of said second set of pointers indicates said physical registers available for said register allocation for said second thread of said microprocessor.

42. The computer readable medium of claim 32, wherein the number of physical register pointers between said retire pointer and said write pointer of said first set of pointers indicates said registers allocated to said destination operand for a plurality of instructions of said first thread that are to become available for reallocation upon retirement of said plurality of instructions.

43. The computer readable medium of claim 33, wherein the number of physical register pointers between said retire pointer and said write pointer of said second set of pointers indicates said physical registers allocated to said destination operand for a plurality of instructions of said second thread that are to become available for reallocation upon retirement of said plurality of instructions.

44. The computer readable medium of claim 32, wherein said register allocated for said instruction of said first thread of said microprocessor that have not yet committed is defined by the number of physical register pointers bounded by said read pointer and said retire pointer minus said fixed distance between said read pointer and said write pointer of said first set of pointers.

45. The computer readable medium of claim 33, wherein said register allocated for said instructions said second thread of said microprocessor that have not yet committed is defined by the number of physical register pointers bounded by said read pointer and said retire pointer minus said fixed distance between said read pointer and said write pointer of said second set of pointers.

46. The computer readable medium of claim 29, wherein said method of register allocation is performed in a modulo-8 memory array.

47. The computer readable medium of claim 44, further comprising the step of restoring said register allocated for said instruction of said first thread of said microprocessor that has not yet committed to its previous state in said first thread of said microprocessor by pointing said read pointer of said first set of pointers to said physical register pointer allocated to said physical register location corresponding to said instruction being flushed by said microprocessor.

48. The computer readable medium of claim 45, further comprising the step of restoring said register allocated for said instruction of said second thread of said microprocessor that has not yet committed to its previous state in said second thread of said microprocessor by pointing said read pointer of said second set of pointers to said physical register pointer allocated to said physical register location corresponding to said instruction being flushed by said microprocessor.

49. A computer readable medium holding computer executable instructions for performing a method in a multithreading microprocessor performing speculative instruction execution, said method comprising the steps of:

providing a single structure to track register allocation for a first thread and a second thread of said multithreading microprocessor;

tracking a first set of pointers in said structure assigned to manage said register allocation for an instruction of said first thread of said multithreading processor to prevent a register allocated as a destination operand for said instruction of said first thread from being overwritten before said instruction of said first thread retires; and tracking a second set of pointers in said structure assigned to manage said register allocation for an instruction of said second thread of said multithreading processor to prevent a register allocated as a destination operand for said instruction of said second thread from being overwritten before said instruction of said second thread retires, whereby said first set of pointers and said second set of pointers track independently of each other.

50. The method of claim 21, wherein the single structure includes at least one protected register region identifying physical register pointers allocated to instructions having a logical destination register decoded and issued but not yet retired.

* * * * *